W. S. Newton,
Hay Fork.
No. 46,018        Patented Jan. 24, 1865.
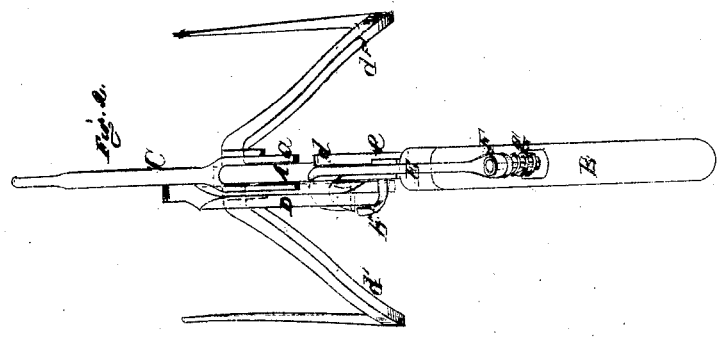
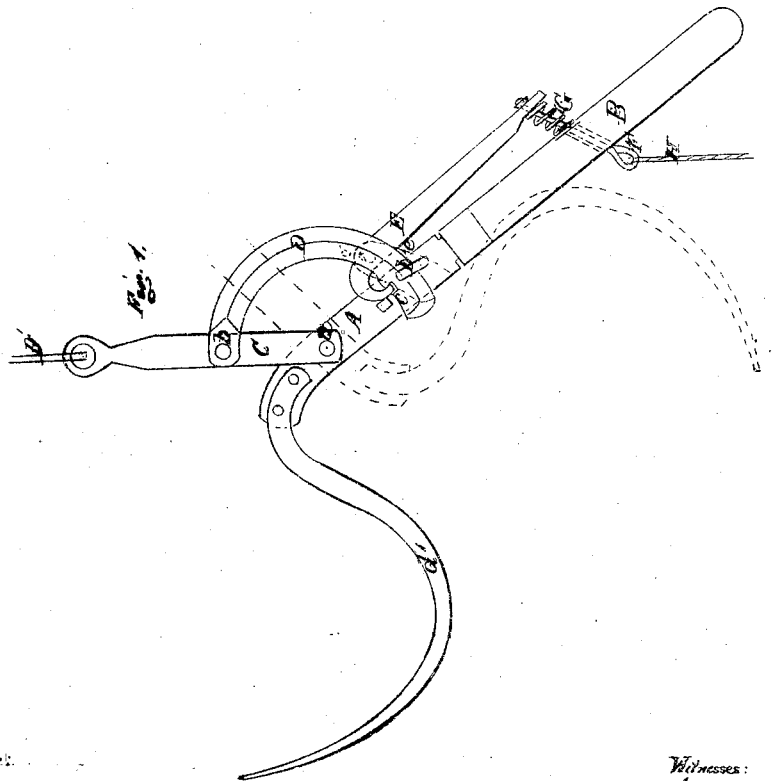
Inventor:
W. S. Newton
Witnesses:

UNITED STATES PATENT OFFICE.

W. S. NEWTON, OF NORWICH, CONNECTICUT.

IMPROVEMENT IN HAY-ELEVATING FORKS.

Specification forming part of Letters Patent No. 46,018, dated January 24, 1865.

*To all whom it may concern:*

Be it known that I, W. S. NEWTON, of Norwich, in the county of New London and State of Connecticut, have invented a new and Improved Horse Hay-Fork; and I do hereby declare that the following is a full, clear, and exact description of the same, reference being had to the accompanying drawings, making a part of this specification, in which—

Figure 1 is a side view of my invention; Fig. 2, an end view of the same.

Similar letters of reference indicate corresponding parts in the two figures.

The object of this invention is to obtain a horse hay-fork which may be economically constructed, be strong and durable and yet light, and capable of being manipulated with the greatest facility by the operator, as hereinafter set forth.

To enable those skilled in the art to fully understand and construct my invention, I will proceed to describe it.

A represents a bar, which may be termed the "shank" or "tang" of the implement, and on which a wooden handle, B, is driven and firmly secured.

C is a bar, the lower end of which is forked, fitted on the shank or tang A, and connected thereto by a pivot-bolt, $a$. The hoisting-rope D' is attached to the upper end of the bar C.

D is a semicircular bar, one end of which is secured to one side of the bar C by a bolt, $b$, said bar passing down by the corresponding side of the shank or tang A, and working within a guide, $b'$, at the side of A.

In the front concave side of the semicircular bar D, near its lower end, there is made a notch, $c$, to receive the front curved end of a lever, E, the fulcrum-pin $d$ of which is in a ledge, $e$, on the shank or tang A. The back part and main portion or longer arm of the lever E is straight, and it has a rod, F, attached to it, which passes loosely through the handle B, and has a spiral spring, G, upon it, said spring being between the handle and the lever and having a tendency to keep the front of E in the notch $c$ of the semicircular bar D, as will be understood by referring to Fig. 1. A rope or cord, H, is attached to the lower end of the rod F.

To the front end of the shank or tang A there are attached two curved tines, $d'$ $d'$, the shape of which will be understood by referring to the drawings. The tines may be of any suitable length, and the bar C is attached to the shank or tang A directly in the rear of the tines.

When the fork is being elevated with its load, the shank or tang A and handle B will be in an inclined position, and the point of the tines $d'$ $d'$ about in a horizontal plane with their inner ends. The tines, therefore, will retain their load. The fork is elevated by having the hoisting-rope D' pass around pulleys arranged in the usual way, the horse being attached to the lower end of said rope. When the fork is elevated over the spot where the hay is to be discharged, the attendant or operator pulls the cord or rope H, and thereby throws the front end of the lever E out from the notch $c$ of the semicircular bar D, and the fork tilts under the gravity of its load to the position shown in red in Fig. 1, and the load is consequently discharged. The horse is then backed and the fork allowed to descend, the operator by pulling the rope or cord H bringing down the handle B and causing the front end of the lever E to engage with the notch $c$. When the fork reaches the load on the wagon or cart, the operator thrusts the tines $d'$ $d'$ into the hay, and the horse being started, the fork and its load are again elevated and the latter discharged, as before, when it reaches the desired point or height.

The arrangement, it will be seen, is extremely simple. The lever E, owing to its length and leverage-power, admits of the fork being tripped to discharge its load with the greatest facility; and the fork may be set as it descends and before reaching the hay on the wagon or cart, so that the operator loses no time in setting it before thrusting the tines into the hay.

Having thus described my invention, what I claim as new, and desire to secure by Letters Patent, is—

The combination and arrangement of the bar C, tang or shank A, with tines and handle attached, semicircular bar D, and catch-lever E, with the spring G and rope H connected with it, substantially as and for the purpose herein set forth.

W. S. NEWTON.

Witnesses:
 DAVID YOUNG,
 S. P. BULKELER.